March 18, 1930.  F. H. OWENS  1,750,940
FILM SPROCKET
Filed July 13, 1927

INVENTOR.
FREEMAN H. OWENS.
BY John C. Brady
ATTORNEY

Patented Mar. 18, 1930

1,750,940

UNITED STATES PATENT OFFICE

FREEMAN H. OWENS, OF NEW YORK, N. Y.

FILM SPROCKET

Application filed July 13, 1927. Serial No. 205,443.

My invention relates to sprockets and particularly to a new type of sprocket especially adaptable for the driving of motion picture film.

One object of my invention is to provide a sprocket which is mounted on a shaft in such manner as to be reversible on such shaft, whereby to compensate for any wear that may take place on one side of the sprocket teeth.

Another object is to provide means on the sprocket for insuring a full and close engagement of a strip of photographic film with the sprocket at the proper point or pitch of the sprocket teeth.

Other objects and advantages in details of construction and operation will be apparent as the description proceeds, reference being had to the figures of the accompanying drawing, wherein like reference numerals indicate like parts.

In the drawing;—

Figure 1:
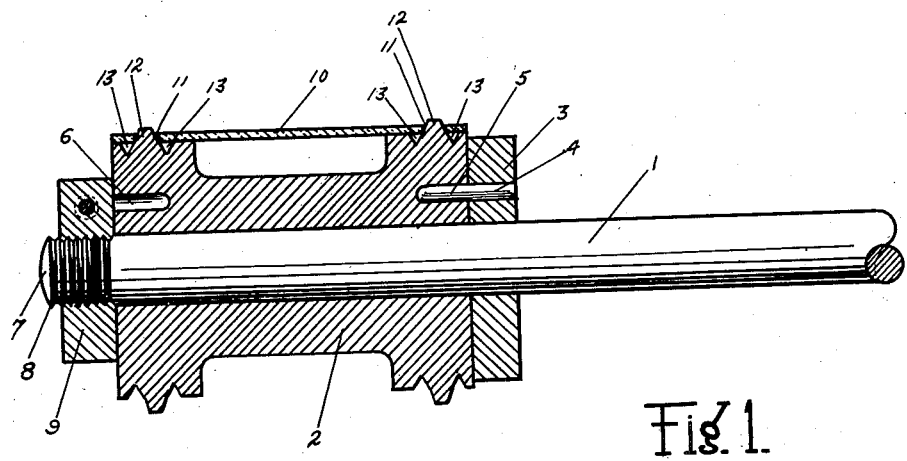
Figure 1 is a detail cross sectional view illustrating my invention.
Figure 2:
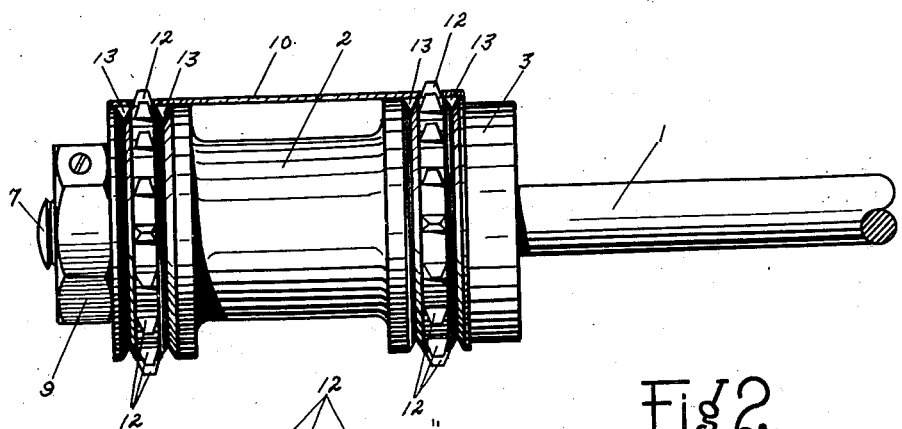
Figure 2 is a detail side elevation thereof.
Figure 3:
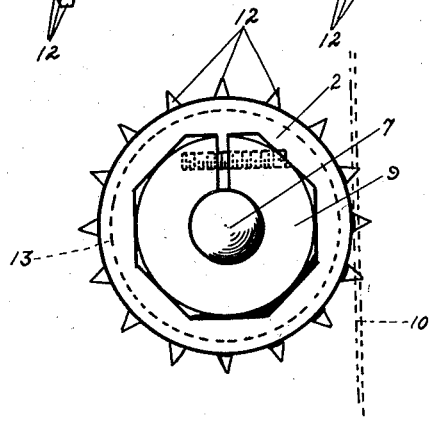
Figure 3 is a detail end view thereof.

The reference numeral 1 indicates a rotatable shaft upon which my improved sprocket 2 is adapted to be mounted for rotation therewith. A flange or shoulder 3 is mounted rigidly on the shaft 1 and is provided with a fixed pin 4 adapted to be received within either of the openings 5, or 6 located in the ends of the sprocket 2.

The sprocket 2 is slidable on the shaft 1 whereby the pin 4 may engage within one of the openings 5 or 6. The end 7 of the shaft 1 is threaded as at 8 to receive a lock nut 9 adapted to be screwed thereon against the outer end of the sprocket whereby the sprocket is rigidly secured in position on the shaft.

A strip of film is indicated in cross section as at 10 with the perforations 11 along the side edges thereof adapted to receive the teeth 12 of the sprocket, whereby said film may be moved. It frequently happens that continued use of a sprocket for driving film results in the friction of the film wearing one side of the sprocket teeth 12 more than the other side. With my improved reversible sprocket, such wear can be compensated for by my removing the lock nut 9, sliding the sprocket 2 off the end of the shaft 1, reversing the sprocket and engaging the pin 5 within the opening 6 on the opposite end of the sprocket, and again clamping the sprocket into position by the lock nut 9. Obviously this arrangement practically doubles the life of the sprocket.

Furthermore, in the use of sprockets for driving photographic film, it frequently occurs that the continuous movement of the film over the sprocket results in leaving a deposit of dirt, scrapings, or other foreign matter on the shoulders of the sprocket adjacent the teeth where the film engages. The result of this deposit is that as it builds up, it naturally raises the film away from the shoulders of the sprocket and as it does so, the teeth 12 of the sprocket engage the film at a different point of pitch which of course changes the driving relation between the film and sprocket. Although this change may not be more than a small fraction, it is very important, particularly when the film 10 is a photographic sound record which must be driven at a continuous and uniform speed, perhaps in synchronous conjunction with a picture film.

To overcome this difficulty, I provide my sprocket with under cut recesses 13 directly adjacent to and on either side of the sprocket teeth 12. The result is that any dirt or scrapings, removed from the film as it passes over the sprocket teeth 12 will drop into the recess 13 instead of building up on the teeth or the adjacent shoulders.

Of course, many changes may be made in details of construction and arrangement of parts without departing from the spirit and scope of my invention. I do not limit myself, therefore, to the exact structure shown and described other than by the appended claims.

I claim:—

1. A film sprocket having teeth, shoulders adjacent said teeth, and recesses cut in said shoulders on each side of said teeth.

2. A film sprocket having teeth, shoulders extending on either side thereof, and a groove cut in said shoulders directly adjacent said teeth and on each side thereof.

3. A film sprocket having teeth, said teeth being undercut on each side to provide peripheral grooves directly adjacent said teeth.

4. In combination, a shaft, a flange thereon, a fixed pin projecting from said flange, a sprocket slidable on said shaft and provided with recesses in each end for receiving said pin whereby said sprocket is reversible and may be secured for rotation with said shaft and a pair of circular rows of teeth positioned adjacent opposite ends of said sprocket and circular recesses cut in said sprocket adjacent opposite sides of each of said circular rows of teeth.

5. In combination, a shaft, a flange thereon, a fixed pin projecting from said flange, a sprocket slidable on said shaft and provided with recesses in each end for receiving said pin whereby said sprocket is reversible and may be secured for rotation with said shaft, removable means for securing said sprocket against longitudinal movement on said shaft, said sprocket having a circular row of teeth adjacent each end thereof at a circular groove cut into said sprocket at each side of each row of said teeth.

FREEMAN H. OWENS.